March 23, 1937.  G. W. HEISE  2,074,506
CLOSURE FOR BATTERIES
Filed Sept. 18, 1931

INVENTOR:
George W. Heise,
BY ATTORNEYS
Byrnes Townsend & Potter

Patented Mar. 23, 1937

2,074,506

UNITED STATES PATENT OFFICE 2,074,506

CLOSURE FOR BATTERIES

George W. Heise, North Olmsted, Ohio, assignor, by mesne assignments, to Union Carbide and Carbon Corporation, a corporation of New York Application September 18, 1931, Serial No. 563,629

13 Claims. (Cl. 136—86)

The invention is a new means and method of sealing the air inlet of an air depolarized reserve cell to exclude air and moisture while the cell is in reserve condition.

The preferred form of the invention is applied to a water-activated type of air depolarized caustic soda reserve cell having a gas-pervious carbon cathode a portion of which is exposed to the atmosphere outside of the cell casing for the purpose of admitting atmospheric oxygen. The anode is zinc, and when the cell is in reserve condition, the electrolyte active material, which is preferably hydrated caustic soda, is cast in a block around the portion of the elements within the cell.

Figure 1:
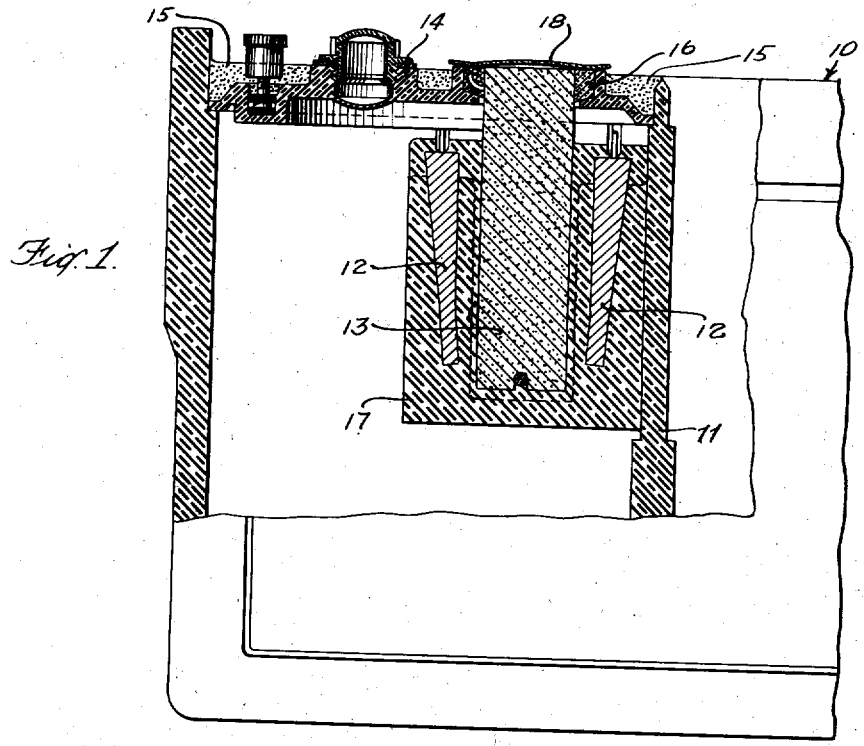
Figure 2:
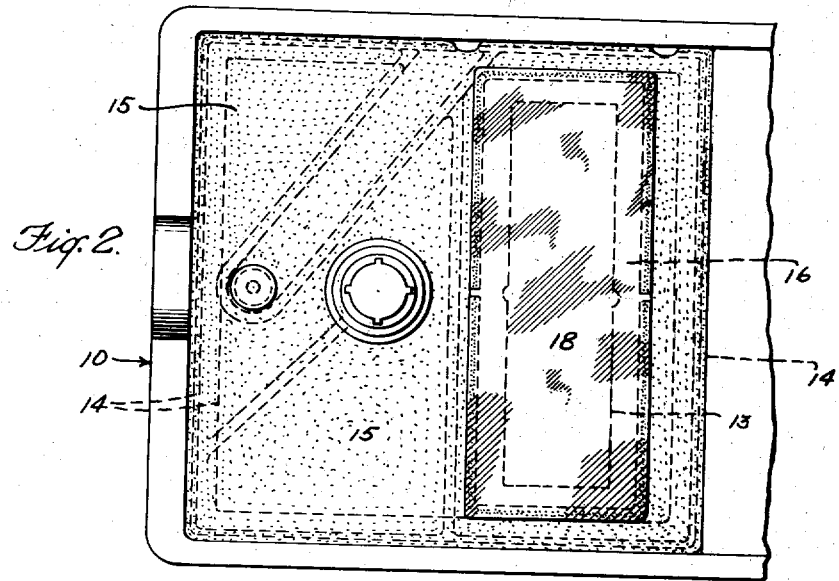

One object is to provide a seal for the air inlet of such a cell to exclude water, moisture, carbon dioxide, etc., while the cell is in reserve condition. Another object is to provide a new method of applying such a seal. Another object is to provide a seal that may be readily removed when the cell is activated and placed in service. Another object is to provide a seal that occupies a minimum amount of space and is not liable to premature breakage. Other objects are to provide a seal that is low in cost, neat in appearance, and economical to apply. Still other aims, objects, and novel features, are disclosed by the following specification and the accompanying illustration in which:

Fig. 1 is a side view of the cell, partially in section, showing my seal in place; and, Fig. 2 is a top view of the cell shown in Fig. 1.

In a cell of the type described the carbon electrode may be sufficiently gas permeable to permit water vapor and carbon dioxide to penetrate into the battery. In consequence, there may be considerable degree of liquefaction of the electrolyte ingredient when the cell remains in reserve condition for a long period of time. This permits an accumulation of concentrated electrolyte solution at the bottom of the battery case and prevents the formation of a solution of uniform concentration when water is added to activate the cell. In case the zinc is bared, excessive corrosion may take place, and the electrolyte material may deteriorate due to reaction with carbon dioxide.

The lime used to increase electrolyte capacity may also become wet and carbonated through absorption of carbon dioxide and correspondingly inoperative. Under certain conditions, especially with very porous carbon, there may even be deposition of moisture in the block, and subsequent creepage and disintegration of the carbon electrode itself.

I have found that these undesirable conditions can be avoided by placing a temporary seal over the air inlet, which in this case is the exposed end of the carbon electrode, to exclude gases and vapors while the cell is in reserve condition. Such a seal need not be perfect in order to attain the desired result as the entrance of a slight amount of gas and vapor will produce no serious injury even though the battery remains in reserve condition for a long time, and, under some conditions, a small opening through the temporary seal is desirable to prevent a change in pressure within the cell from that outside.

As a seal I prefer a thin membrane or sheet of flexible material that is relatively impervious to gases and vapors such as regenerated cellulose in sheet form, viscose, waxed paper, and others having similar properties.

The invention will be more clearly understood by referring to the drawing which shows a preferred embodiment thereof having a battery casing 10 divided by a a central partition or wall 11 into two compartments containing identical sets of cell elements of which only one is shown.

Each compartment contains one or more zinc anodes 12 and a porous carbon cathode 13 that extends upward through compartment cover 14 to the outer atmosphere to which the upper surface of the cathode is exposed when the cell is in operative condition. The joint between cover 14 and casing 10 is closed by a thermoplastic compound 15, and the joint between cathode 13 and cover 14 is closed by another thermoplastic compound 16 that may have different characteristics.

During the assembly of the cell the active ingredient of the electrolyte, such as hydrated caustic soda, is cast in a block 17 around the portion of elements 12 and 13 within casing 10.

In order to preserve the cell while in reserve condition the exposed surface of cathode 13 is sealed by covering it with a rectangular sheet of sealing or insulating material 18, such as regenerated cellulose, having a margin that extends outward beyond the edge of the electrode ½ to ¾ of an inch on all sides, and then applying heat to the portion of this margin over sealing compound 16 until it adheres to the cellophane. This adhesion may be secured in other ways, such as by applying pressure to the regenerated cellulose before the sealing compound has entirely cooled.

This heat may be applied by any suitable means such as a soldering iron or other heated object of suitable shape. The width of the strip where the regenerated sheet cellulose and sealing material adhere should be comparatively narrow. I have found a width of ⅛ inch or less to be satisfactory and desirable. Also, a margin of at least ⅛ inch should be left outside this adhering portion to provide a grip where the seal may be grasped and pulled off when the cell is placed in service.

Another convenient method of applying heat to cause the seal and compound to adhere is by means of a hollow rectangle of metal having a face of suitable width. It has been found that, although too much heat can be applied, the temperature may be easily regulated to produce satisfactory adhesion to the compound from which the seal may be readily stripped when the cell is activated.

In case a small opening through the seal is desired the face of the rectangular heating iron may be provided with a notch so that for a space of 1/16 to ⅛ of an inch there is no adhesion between the regenerated cellulose sheet and the sealing material. This small opening is sufficient to maintain atmospheric pressure within the cell without admitting a detrimental amount of either gas or moisture. This small opening through the temporary seal may also be secured by inserting a piece of string, cord, thread, paper, or the like, under the edge of the membrane when it is applied to the sealing material.

It is evident, of course, that a rigid cover of metal or other material might be used to enclose the exposed portion of the electrode and be held in place by having the edge thereof, possibly downturned, imbedded in the thermoplastic compound surrounding the cathode. The use of a thin membrane as a seal is preferred, however, because pressure within a cell will rupture it before other damage is caused. While such pressure within a cell is not expected, it may develop, however, from a defect in a cell or from other cause.

It is to be understood that equivalent materials may be employed in various alternative arrangements, as well as equivalent methods of sealing without departing from the spirit of my invention or the scope of my claims.

I claim:

1. An air depolarized caustic soda cell of the water-activated type comprising a casing of dielectric material; a plurality of elements within said casing including a gas pervious carbon cathode having an exposed portion outside of said casing; a block of hygroscopic electrolyte ingredient surrounding the portion of said elements within said casing; a thermoplastic sealing compound surrounding the exposed portion of said cathode; and a thin sheet of flexible waterproof material adhering to said compound and covering the exposed portion of said cathode thereby sealing it from contact with both atmosphere and moisture while the cell is in reserve condition but adapted to be readily removed when the cell is activated and placed in service.

2. An air depolarized caustic soda cell comprising a casing; a plurality of elements within said casing including a gas pervious cathode having an exposed portion; a block of hygroscopic electrolyte ingredient surrounding the portion of said elements within said casing; a thermoplastic sealing compound surrounding the exposed portion of said cathode; and a sheet of flexible impervious material adhering to said sealing material and covering the exposed portion of said cathode thereby sealing it from contact with atmosphere while the cell is in reserve condition but adapted to be readily removed when the cell is activated and placed in service.

3. An air depolarized cell comprising a casing; a cathode having an exposed gas pervious portion outside of said casing; a hygroscopic electrolyte ingredient within said casing; a thermoplastic compound around the exposed portion of said cathode; and a flexible sheet of impervious material covering the exposed portion of said cathode and adhering to said compound.

4. An air depolarized cell comprising a casing; a cathode having an exposed moisture pervious portion outside of said casing; a thermoplastic compound around the exposed portion of said cathode; a component of said battery within said casing which is adversely affected by normal atmosphere; and a thin sheet of material impervious to moisture covering the exposed portion of said cathode and adhering to said compound.

5. An air depolarized cell comprising a sealed casing; a gas pervious cathode having a portion exposed outside of said seal; a thermoplastic compound around said cathode; a hygroscopic gas reactive electrolyte forming material within said casing and a sheet of insulating material covering the exposed portion of said cathode and adhering to said compound.

6. An air depolarized cell comprising a sealed casing; a gas pervious cathode extending outward through said seal; a thermoplastic compound around said cathode; electrolyte forming material which is deleteriously affected by normal atmosphere within said casing; and a sheet of insulating material covering the exposed portion of said cathode and adhering to said compound; said insulating material being less resistant to internal pressure than any other portions of said cell.

7. An air depolarized cell comprising a casing; a cathode having an exposed gas pervious portion outside of said casing; thermoplastic compound around the exposed portion of said cathode; a hygroscopic electrolyte forming material within said casing; and a sheet of viscose covering the exposed portion of said cathode and adhering to said compound.

8. An air depolarized cell comprising a casing; a cathode having an exposed gas pervious portion outside of said casing; thermoplastic compound around the exposed portion of said cathode; a hygroscopic electrolyte material within said casing; and a sheet of waxed paper covering the exposed portion of said cathode and adhering to said compound.

9. An air depolarized cell comprising a casing; a cathode having an exposed gas pervious portion outside of said casing; thermoplastic compound around the exposed portion of said cathode; an electrolyte material within said casing which is adversely affected by normal atmosphere; and a sheet of regenerated cellulose covering the exposed portion of said cathode and adhering to said compound.

10. An air depolarized cell comprising a casing; a cathode having an exposed portion outside of said casing and forming an air inlet; an electrolyte ingredient within said casing which is adversely affected by normal atmosphere; and a flexible sheet of impervious material covering the exposed portion of said cathode and adhering to the top and forming a seal for the air inlet.

11. An air depolarized cell comprising a casing; a cathode having an exposed gas pervious portion outside of said casing; a hygroscopic electrolyte ingredient within said casing; and a sheet of impervious material covering the exposed portion of said cathode and adhering to said casing around said exposed portion.

12. An air depolarized cell comprising a casing, a gas and moisture reactive electrolyte ingredient within said casing; a cover having an aperture, an electrode pervious to moisture and gas extending through said aperture, a ridge on said cover surrounding but spaced from said aperture, sealing material between said electrode and said ridge, and means for sealing said cell against entrance of gas and moisture comprising a sheet of regenerated cellulose covering the exposed portion of said electrode and adhering to said sealing material.

13. An air depolarized cell comprising a casing, a cover for said casing, said cover being provided with an aperture, an electrode pervious to gas and moisture extending through said aperture, hygroscopic electrolyte-forming material within said casing, sealing material on said cover and surrounding said electrode, the upper surface of said sealing material being substantially flush with the upper surface of said electrode and means for sealing the exposed portion of said electrode comprising a sheet of material impervious to moisture covering the upper surface of said electrode and adhering to said sealing material.

GEORGE W. HEISE.

CERTIFICATE OF CORRECTION.

Patent No. 2,074,506.            March 23, 1937.

GEORGE W. HEISE.

It is hereby certified that error appears in the printed specification of the above numbered patent requiring correction as follows: Page 3, second column, line 7, claim 13, after the word "hygroscopic" insert the words gas reactive; and that the said Letters Patent should be read with this correction therein that the same may conform to the record of the case in the Patent Office.

Signed and sealed this 11th day of May, A. D. 1937.

(Seal)            Henry Van Arsdale
Acting Commissioner of Patents.

11. An air depolarized cell comprising a casing; a cathode having an exposed gas pervious portion outside of said casing; a hygroscopic electrolyte ingredient within said casing; and a sheet of impervious material covering the exposed portion of said cathode and adhering to said casing around said exposed portion.

12. An air depolarized cell comprising a casing, a gas and moisture reactive electrolyte ingredient within said casing; a cover having an aperture, an electrode pervious to moisture and gas extending through said aperture, a ridge on said cover surrounding but spaced from said aperture, sealing material between said electrode and said ridge, and means for sealing said cell against entrance of gas and moisture comprising a sheet of regenerated cellulose covering the exposed portion of said electrode and adhering to said sealing material.

13. An air depolarized cell comprising a casing, a cover for said casing, said cover being provided with an aperture, an electrode pervious to gas and moisture extending through said aperture, hygroscopic electrolyte-forming material within said casing, sealing material on said cover and surrounding said electrode, the upper surface of said sealing material being substantially flush with the upper surface of said electrode and means for sealing the exposed portion of said electrode comprising a sheet of material impervious to moisture covering the upper surface of said electrode and adhering to said sealing material..

GEORGE W. HEISE.

CERTIFICATE OF CORRECTION.

Patent No. 2,074,506.                                           March 23, 1937.

GEORGE W. HEISE.

It is hereby certified that error appears in the printed specification of the above numbered patent requiring correction as follows: Page 3, second column, line 7, claim 13, after the word "hygroscopic" insert the words gas reactive; and that the said Letters Patent should be read with this correction therein that the same may conform to the record of the case in the Patent Office.

Signed and sealed this 11th day of May, A. D. 1937.

Henry Van Arsdale
Acting Commissioner of Patents.

(Seal)

CERTIFICATE OF CORRECTION.

Patent No. 2,074,506.  March 23, 1937.

GEORGE W. HEISE.

It is hereby certified that error appears in the printed specification of the above numbered patent requiring correction as follows: Page 3, second column, line 7, claim 13, after the word "hygroscopic" insert the words gas reactive; and that the said Letters Patent should be read with this correction therein that the same may conform to the record of the case in the Patent Office.

Signed and sealed this 11th day of May, A. D. 1937.

(Seal)

Henry Van Arsdale
Acting Commissioner of Patents.